(12) United States Patent
Farmer et al.

(10) Patent No.: US 7,786,623 B2
(45) Date of Patent: Aug. 31, 2010

(54) POWER MANAGEMENT FOR ELECTRONIC DEVICES

(75) Inventors: Michael Scott Farmer, Plano, TX (US); Vincent William Ellis, Plano, TX (US); Kenneth Scott Carpenter, Rowlett, TX (US)

(73) Assignee: AMX LLC, Richardson, TX (US)

( * ) Notice: Subject to any disclaimer, the term of this patent is extended or adjusted under 35 U.S.C. 154(b) by 992 days.

(21) Appl. No.: 11/516,375

(22) Filed: Sep. 6, 2006

(65) Prior Publication Data

US 2007/0054651 A1 Mar. 8, 2007

Related U.S. Application Data

(60) Provisional application No. 60/715,330, filed on Sep. 7, 2005.

(51) Int. Cl.
*H01H 35/14* (2006.01)
(52) U.S. Cl. ...................................... 307/117
(58) Field of Classification Search ................. 307/117
See application file for complete search history.

(56) References Cited

U.S. PATENT DOCUMENTS

| | | | |
|---|---|---|---|
| 4,380,121 A | 4/1983 | Naimer et al. | |
| 4,969,508 A | 11/1990 | Tate et al. | |
| 5,381,142 A | 1/1995 | Simmons, Jr. | |
| 5,545,857 A | 8/1996 | Lee et al. | |
| 5,568,367 A | 10/1996 | Park | |
| 5,657,091 A | 8/1997 | Bertram | |
| 5,689,353 A | 11/1997 | Darbee et al. | |
| 5,812,085 A | 9/1998 | Barraza et al. | |
| 5,959,751 A | 9/1999 | Darbee et al. | |
| 6,268,845 B1* | 7/2001 | Pariza et al. | 345/581 |
| 6,788,293 B1* | 9/2004 | Silverbrook et al. | 345/173 |
| 7,084,762 B2* | 8/2006 | Pedrazzini et al. | 340/545.5 |
| 7,199,783 B2* | 4/2007 | Wenstrand et al. | 345/156 |
| 2004/0119484 A1* | 6/2004 | Basir et al. | 324/680 |

* cited by examiner

*Primary Examiner*—Michael Rutland Wallis
(74) *Attorney, Agent, or Firm*—Gardere Wynne Sewell LLP; Karl L. Larson

(57) ABSTRACT

A cordless electronic device with power management system and method is provided that includes an outer surface, a power consumption circuit operable to consume power and for use in a cordless electronic device, a power supply circuit operable to regulate the power from a power source used to power the power consumption circuit of the cordless electronic device, a power control circuit operable to receive an input signal and to place the power consumption circuit in a lower or higher power state upon receipt of the input signal, a presence sensor operable to detect the presence of a user and to provide a presence sensor input signal to the power control circuit to place the power consumption circuit in the higher power state.

55 Claims, 7 Drawing Sheets

POWER MANAGEMENT FOR ELECTRONIC DEVICES

CROSS REFERENCE TO RELATED APPLICATIONS

Pursuant to 35 U.S.C. §119(e), the present document claims the benefit of the earlier filing date of co-pending U.S. provisional patent application Ser. No. 60/715,330, entitled "Remote Control with Power Management," filed in the U.S. Patent and Trademark Office on Sep. 7, 2005, hereby incorporated by reference, having common inventors as the present document.

BACKGROUND OF THE INVENTION

1. Field of the Invention

The present invention relates in general to power management and more particularly, but not by way of limitation, to power management for cordless electronic devices.

2. Discussion of the Background

Cordless electronic devices, including without limitation portable remote control devices, universal remotes, cell phones, telephones, PDAs, televisions, radios, media players, hand-held tools, scanners, GPS devices, electronic compasses and the like, are powered by a remote power supply, such as a battery, power cell or the like. It is desirable to maximize the time that a cordless electronic device may operate before its power supply must be replaced or recharged. However, the functionality of and demands on cordless electronic devices have increased through the years. The increased functionality and demands require greater power consumption, which results in greater power supply demand and reduced convenience and reliability because of the shorter intervals required between replacing or recharging batteries.

One such cordless electronic device is a remote control, which is used to wirelessly or remotely control numerous devices and appliances found in homes and businesses. The backlighting or lighting of remote control buttons or display areas, such as LED type displays, is highly desirable to allow for convenient use in low light conditions. Further, it is often desirable to include backlighting or lighting of remote control buttons and display areas even in daylight conditions. For example, certain ornamental designs (text size, color of text, color of text background) of remote controls make the button labels more difficult to read in daylight without backlight. Backlighting, however, requires considerable power, which drastically reduces power source life before replacement or recharging. Thus, it is desirable to minimize the use of backlighting, and not to keep the backlighting energized at all times.

It is typical for a remote control with backlighting to require the user to first press one of the buttons on the remote in order to turn on the backlight. This requires that the user know the exact location of the desired button or requires the user to use an additional button specifically for controlling the backlight of the unit followed by a second button press of the desired button. This wastes precious real-estate on the remote control and is difficult for the user.

Some remote controls include a tilt or vibration sensor that will turn the backlight on when the remote control is picked up by the user. It is not uncommon for the tilt-sensor to get "stuck" such that more violent motion is required to turn on the backlight or for the tilt-sensor to register movement due to vibrations not related to the user picking up the remote.

Thus, there exists an unmet need in the prior art for improved power management functionality in a cordless electronic device that substantially eliminates one or more of the disadvantages and problems outlined above.

SUMMARY OF THE INVENTION

Accordingly, one aspect of the present invention is a cordless electronic device with power management that includes an outer surface, a power consumption circuit operable to consume power and for use in a cordless electronic device, a power supply circuit operable to regulate the power from a power source used to power the power consumption circuit of the cordless electronic device, a power control circuit operable to receive an input signal and to place the power consumption circuit in a lower or higher power state upon receipt of the input signal, a presence sensor operable to detect the presence of a user and to provide a presence sensor input signal to the power control circuit to place the power consumption circuit in the higher power state.

Another aspect of the present invention is a method of managing power for a power consumption circuit operable to consume power of a cordless electronic device, the method includes providing a power control circuit operable to receive an input signal and to place the power consumption circuit in a lower or higher power state upon receipt of the input signal, providing a presence sensor operable to detect the presence of a user, detecting the presence of the user, sending a presence sensor input signal to the power control circuit upon the user detection, and placing the power consumption circuit in the higher power state upon receipt of the presence sensor input signal.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein.

DETAILED DESCRIPTION OF THE PREFERRED EMBODIMENTS

Figure 1:
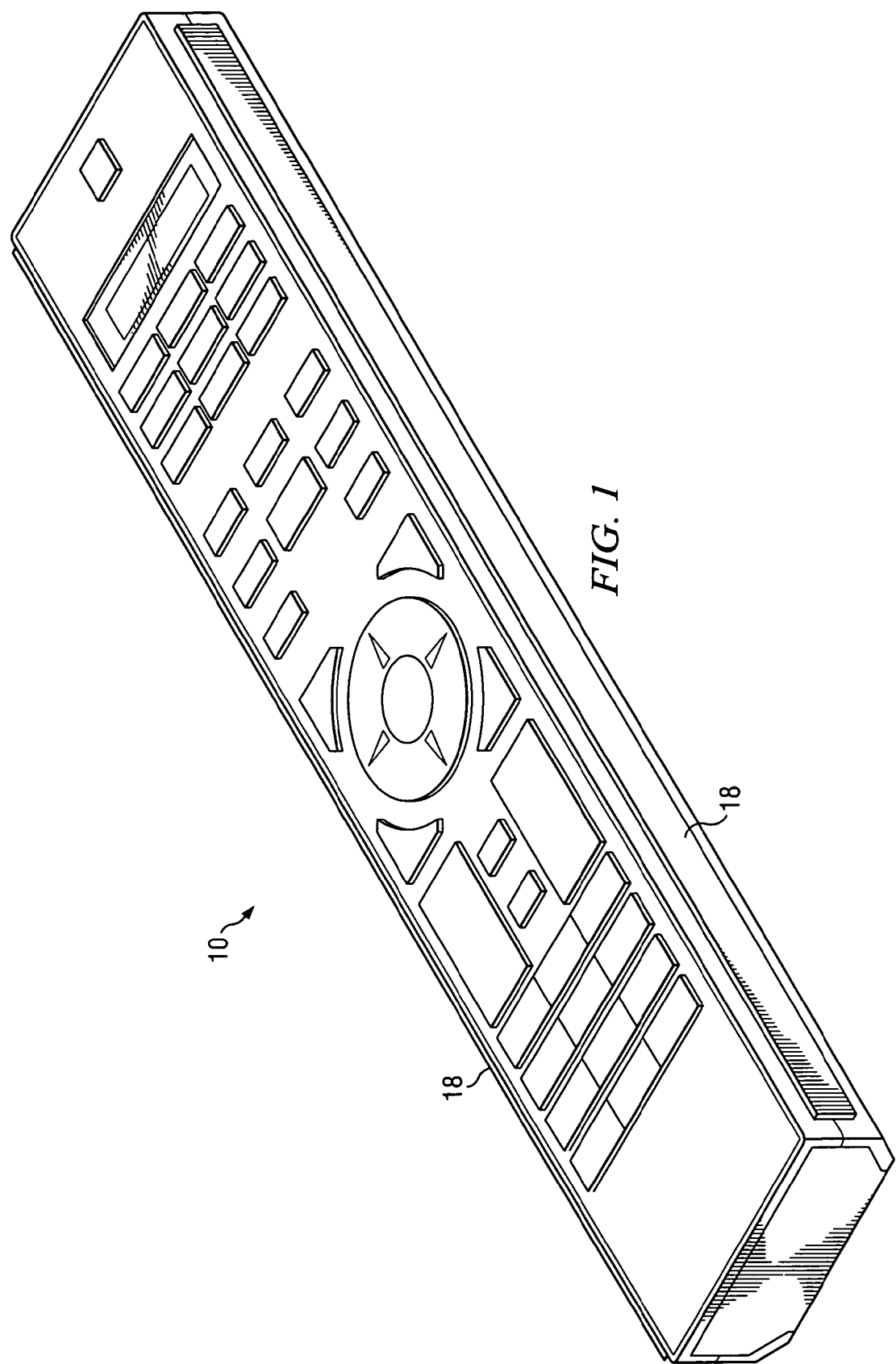
FIG. 1 is a perspective view illustrating a remote control with power management according to one embodiment of the present invention.

Referring now to the drawings, wherein like reference numerals designate identical or corresponding parts throughout the several views, preferred embodiments of the present invention are described.

Figure 2:
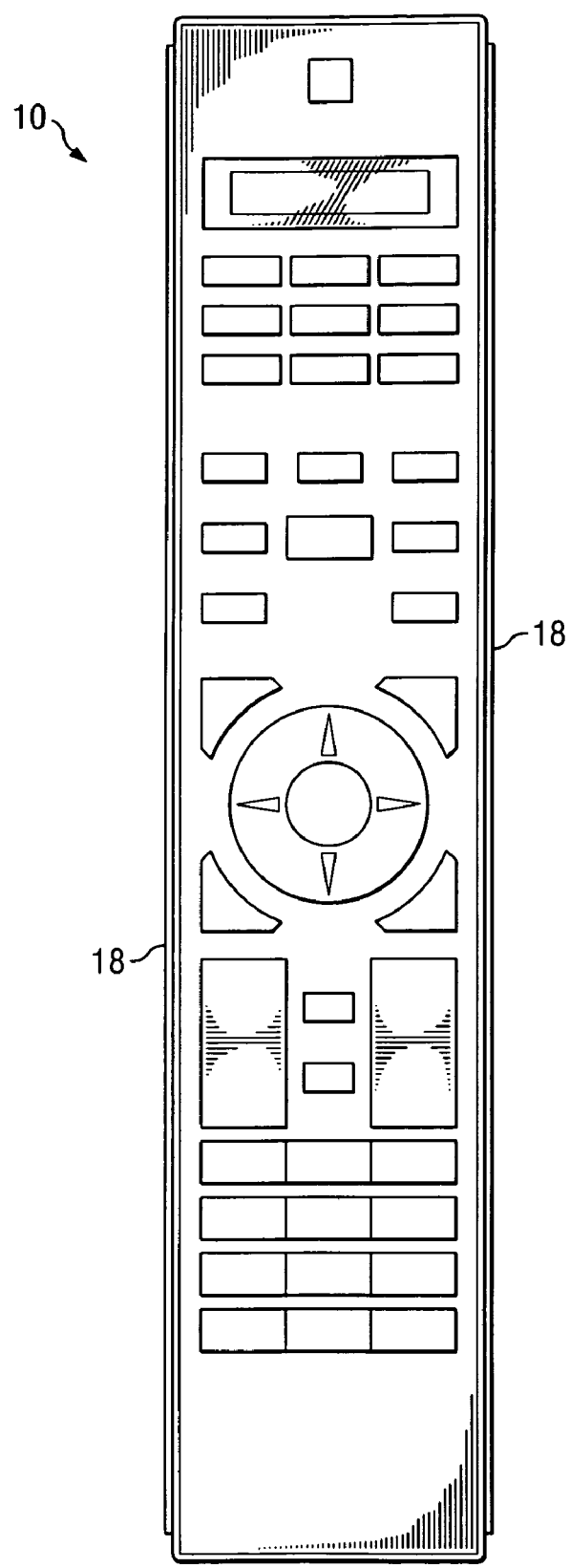
FIG. 2 is a top view of the remote control with power management of FIG. 1 illustrating an embodiment of a keypad layout and display according to an embodiment of the present invention.

Referring to FIGS. 1 and 2, perspective and top views illustrating a remote control 10 with power management functionality according to one embodiment of the present invention is shown. The remote control 10 may include a plurality of buttons, keypad and/or other controls. The remote control 10 may be implemented with backlighting to assist with ease of use, especially in a low light conditions. The various buttons of the remote control 10 may be used in connection with a master controller to control any number of other electronic devices, or the remote control 10 may be used as a "universal remote control" to individually and directly control any number of devices, including, but not limited to, DVD players, CD player/recorders and VCR devices, along with virtually any other electronic device and/or audio/video device. However, it is to be understood that the remote control 10 is only one possible implementation of the present invention, and that the power management functionality is not limited to remote control devices, but may also apply to any cordless electronic devices, including without limitation portable remote control devices, universal remotes, cell phones, telephones, PDAs, televisions, radios, media players, handheld tools, scanners, GPS devices, electronic compasses and the like.

Figure 3:
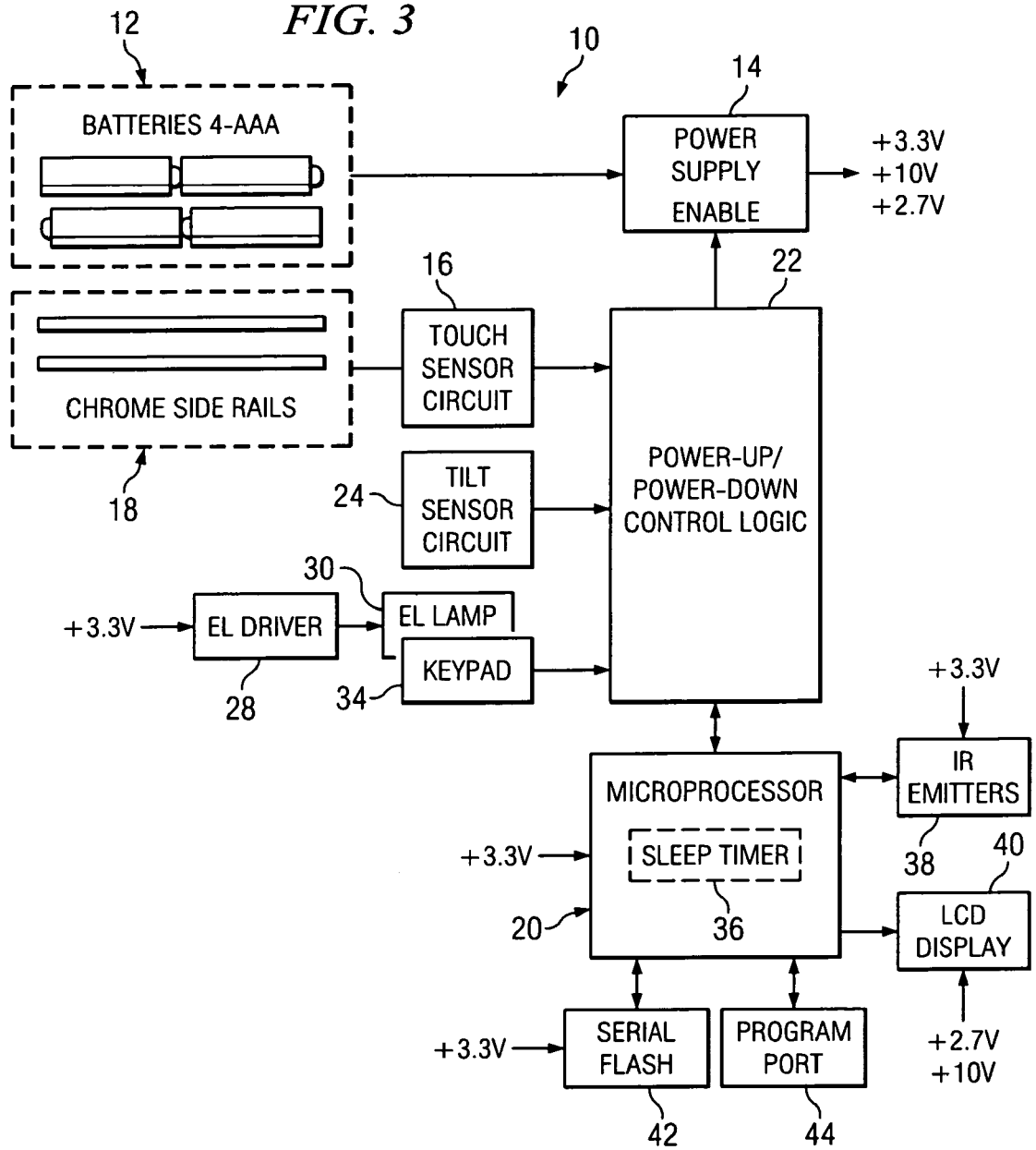
FIG. 3 is a block diagram illustrating one implementation of a remote control with power management according to an embodiment of the present invention.

Referring to FIG. 3, a block diagram illustrating one possible implementation of the remote control 10 with power management functionality according to the present invention is shown. A power supply 12, such as a battery, power cell or the like, is used to supply power to the remote control 10. Various circuitry, such as power supply circuit 14, may be used to provide desired voltage levels for use within the remote control 10. For instance, the implementation shown in FIG. 3 includes circuitry requiring a DC voltage at +3.3 volts, +10 volts, and +2.7 volts.

In one embodiment, the power supply circuit 14 receives input signals from a power control circuit 22 to control and enable the supply of power to various power consumption circuits, such as lights, microprocessors, etc. An electroluminescent lamp driver 28 may be enabled to receive power from the power supply 12 through the enabling provided by the power control circuit 22. This allows a electroluminescent lamp 30 to be energized to light one or more of the buttons or displays of a keypad 34 of the remote control 10.

Figure 7:
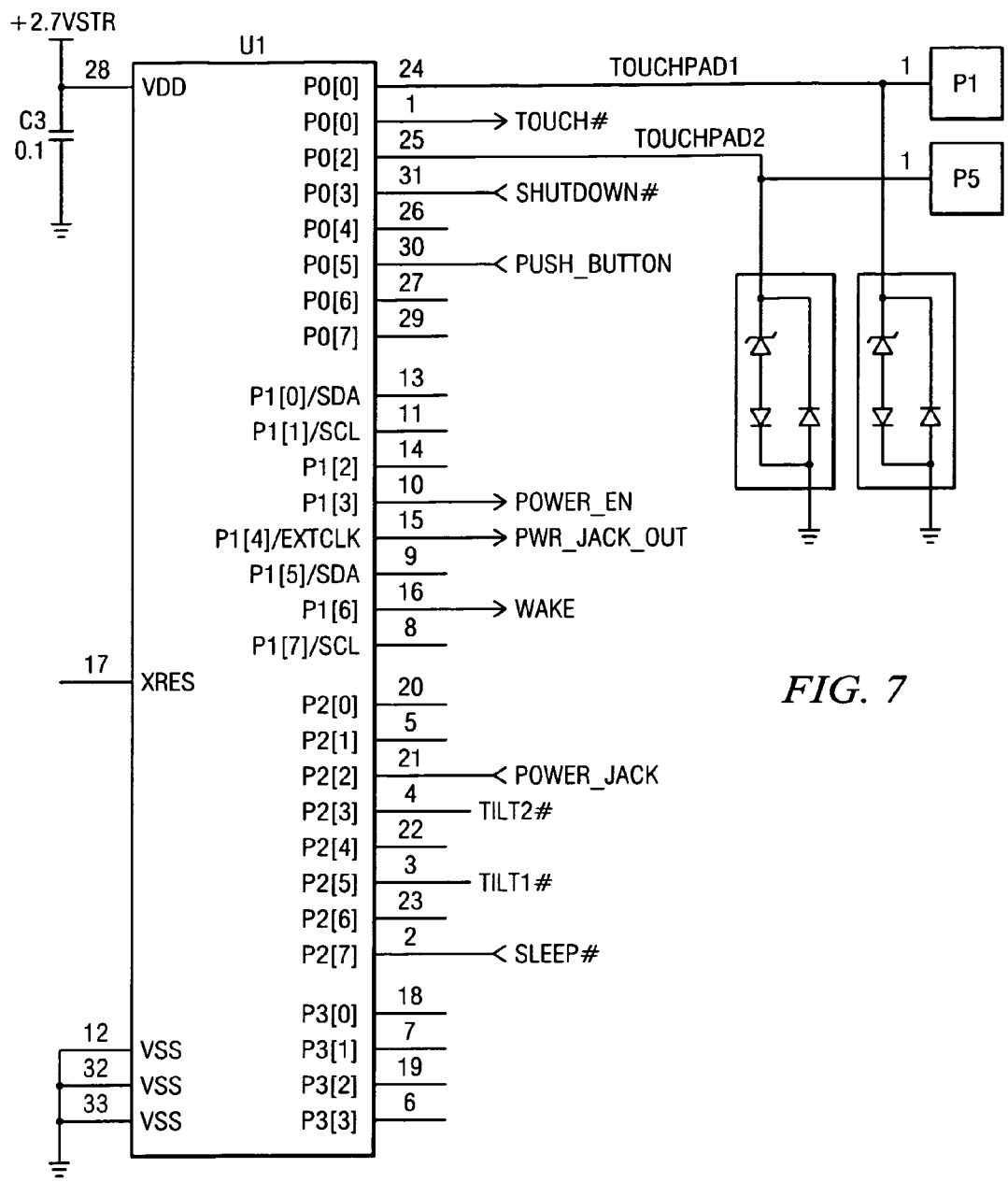
FIGS. 7 and 8 are circuit schematics or diagrams illustrating exemplary aspects of the touch sensor circuit used in certain embodiments of the present invention.
Figure 8:
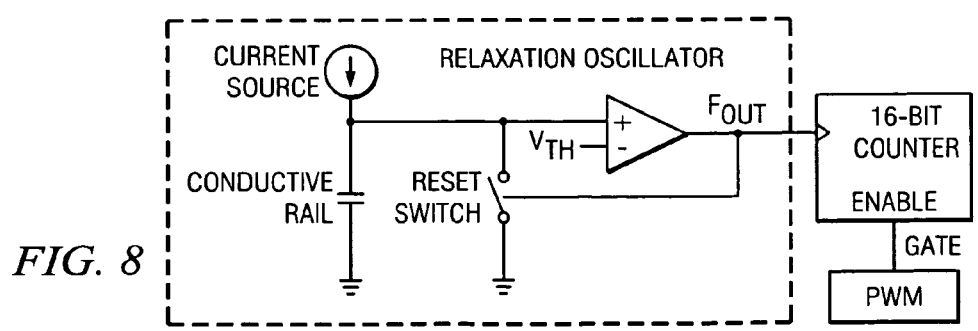

A touch sensor circuit 16 may be used to determine whether a user has touched the remote control 10. In one embodiment, the touch sensor circuit 16 is adapted from the exemplary touch sensor circuit shown in FIGS. 7 and 8. When a user picks up the remote control 10, the touch sensor circuit 16 detects that the remote control 10 is in the hands of the user, causing the remote control 10 to enter a higher power state. Initiation of a higher power state includes, but is not limited to, the remote control 10 turning on the backlight so that the keypad 34 may be more easily and conveniently used. The backlight or light may further be energized upon the detection that a button on keypad 34 has been pressed. A microprocessor or other power consuming circuitry may also be activated as a result of the initiation of a higher power state.

In one embodiment, one or more electrically conductive rails 18 are used to determine whether the user is touching the remote control 10. For instance, two chrome side rails may be provided as electrically conductive rails 18 on opposing sides of the remote control 10 as inputs to the touch sensor circuit 16. The electrically conductive rails 18 are positioned such that at least one of the electrically conductive rails 18 is in contact with a user's hand in a substantially normal placement of the user's hand around the remote control 10. The user's contact with the electrically conductive rails 18 is detected by the touch sensor circuit 16 which directly or indirectly provides a touch sensor signal to the power control circuit 22 resulting in the remote control 10 being placed in a higher power state. The touch sensor circuit 16 may be implemented in any of a number of known and available configurations. For example, the touch sensor circuit 16 may include circuitry to measure impedance, resistance, capacitance and/or other electrical or circuit related quantities that may be used to determine whether a user has touched one of the conductive areas, such as the electrically conductive rails 18, of the remote control 10. For instance, touch sensor circuit 16 may detect the user's touch upon detection of a AC power carrier frequency in the user (e.g., 60 Hz) resulting from the user touching electrically conductive rails 18. The touch sensor circuit 16 may also be used to determine whether the user is no longer touching the remote control 10, and the remote control 10 may enter a lower power or sleep state upon such detection.

The touch sensor circuit 16 may also be implemented as a close proximity detector to detect the near presence of a user. This circuitry is typically implemented using capacitive sensing technology available to one of ordinary skill in the art. When the touch sensor circuit 16 detects the presence, or near presence, of a user, a presence sensor input signal (e.g., a touch sensor input) is directly or indirectly provided to the power control circuit 22 to place the power supply circuit 14 in a high (or higher) power state. The power control circuit 22 then supplies or at least increases the supply of power from power supply 12, such as a battery, power cell or the like, to the desired powered consumption circuit, such as the electroluminescent lamp driver 28.

The remote control 10 is primarily controlled by the microprocessor 20, which is shown, in one embodiment, operating at a voltage of 3.3 volts. The microprocessor 20 or other like circuitry may implement a sleep timer 36 to monitor the activity and inactivity periods of the remote control 10. Upon expiration of the sleep timer 36 due to inactivity of the remote control, the remote control may be configured to lower or turn off the power supplied to any power consumption circuitry. For instance, the backlight may be turned off after a period of inactivity. The remote control 10 is considered inactive where for a predetermined or programmed period of time (or elapsed period), such as 15 seconds, no buttons have been pushed, the remote control 10 has not been tilted, and/or the touch sensor circuit 16 has not detected a user.

In one embodiment, a tilt sensor circuit 24 (or motion sensor) is coupled to the power control circuit 22. The user may place the remote control 10 in a higher power state by simply changing the position, angle and/or placement of the remote control. The user may activate the tilt sensor circuit 24 by tilting the remote control 10 in any direction past a predetermined or programmed tilt activation angle, such as 20 degrees off of horizontal, or by giving the remote control 10 a quick shake. Upon detection of a change in the position, angle and/or placement of the remote control 10, the tilt sensor circuit directly or indirectly provides a tilt sensor signal to the power control circuit 22 resulting in the remote control 10 being placed in a higher power state. The tilt sensor circuit 24 may comprise any known or available circuitry that detects movement, such as angular movement or acceleration. For example, the tilt sensor circuit 24 may be implemented as a motion sensor that includes, but is not limited to, a vibration sensor, an accelerometer, or other method to detect a change in the remote's position or movement. The output of the tilt sensor circuit 24 is used to place the remote control 10 in a higher power state. In one embodiment, the tilt sensor circuit 24 is configured to operate only when the touch sensor circuit 16 has detected the user's near presence or touch. Any false activation by the tilt sensor circuit 24 is thus ignored when the remote is not in the near presence of the user's hand, thereby, reducing the possibility of placing the remote control 10 in a higher power state upon inadvertent movement of the remote control, such as the remote control 10 falling to the ground.

Obviously, the touch sensor circuit 16, the tilt sensor circuit 24 and the power control circuit 22 along with any circuitry involving the keypad 34 may be integrated or separated within the scope of the present invention.

The keypad 34 may be configured to provide input to the power control circuit 22. For instance, the remote control 10 may be configured such that pressing one or any of the buttons on the keypad 34 will also cause the remote to enter a higher power state. The remote control may be further configured such that the keypad 34 provides input to the power control circuit 22 only when the touch sensor circuit 16 has detected the near presence of a user. This configuration prevents the remote control 10 from remaining in a higher power state if the keypad 34 is inadvertently depressed. This may occur if the remote control 10 is wedged between the couch cushions or one or more buttons of the keypad 34 is depressed by the weight of an object on top of the keypad 34. In another embodiment, in addition to entering a lower power state after a period of inactivity, the remote control 10 may be manually forced into the lower power state by pressing and holding a button on the keypad 34 for more than a predetermined or programmed period of time, such as one second. Various other techniques may be used to manually force the remote control 10 into a lower power state, including, but not limited to, pressing more than one button at the same time.

Various other inputs/outputs to the microprocessor 20 may also be provided. The microprocessor 20 may provide signals to an IR (or electromagnetic) transmitter 38 to provide a desired infrared code or signal based on a button pushed on the keypad 34 or other user action. An LCD display may be controlled by the microprocessor 20, to assist with displaying text, characters and/or graphics on the LCD display 40 which may utilize fonts stored in a serial flash 42. A program port 44 may be used to program the remote control 10, such as to change the sleep timer 36 period, the tilt activation angle of the tilt sensor circuit 24, the brightness of the LCD, the LCD display functionality, etc.

Figure 4:
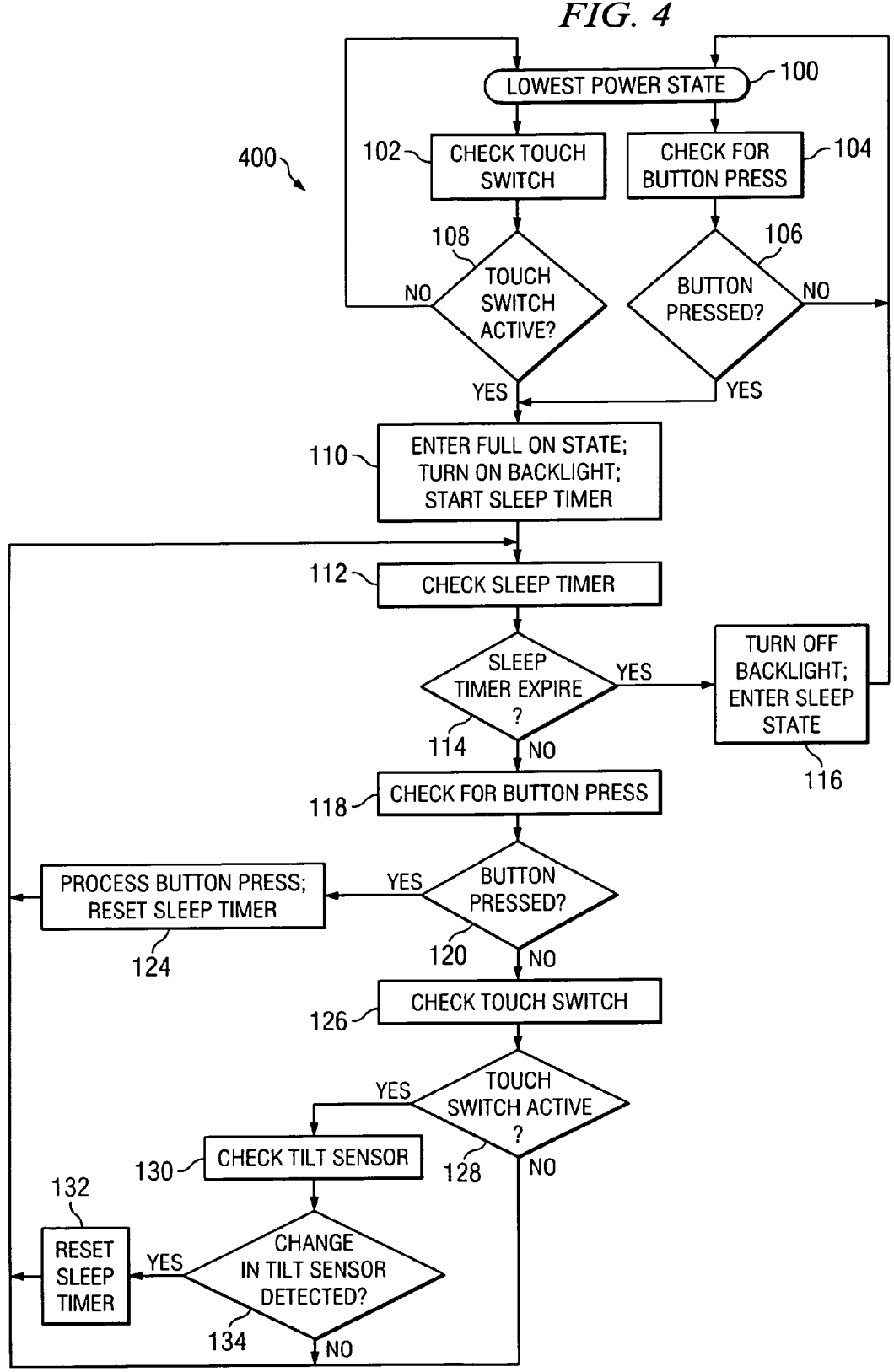
FIGS. 4-6 are flow charts illustrating implementations of a cordless electronic device with power management according to possible embodiments of the present invention.

Referring to FIG. 4, a flow chart illustrating an implementation of a cordless electronic device with power management according to one possible embodiment of the present invention is shown. At block 100, the cordless electronic device is in a lower power state. At blocks 102 and 108, a determination of whether the touch sensor circuit 16 has detected that a user has touched the cordless electronic device occurs. Electrically conductive rails 18, such as two chrome side rails, may be used as inputs to the touch sensor circuit 16. If a user's touch is detected, the cordless electronic device enters a higher power state at block 110. According to one embodiment, touch sensor circuit 16 detects the user's touch upon detection of a AC power carrier frequency in the user resulting from the user touching electrically conductive rails 18. For instance, touch sensor circuit 16 may detect an AC power carrier frequency of 60 Hz in the user when the user touches electrically conductive rails 18. At the initiation of the higher power state, a sleep timer 36 is started and the backlight may be illuminated. If a user's touch is not detected, the cordless electronic device remains in the lower power state. The cordless electronic device may also enter a higher power state upon detection of a button press. At block 100, the cordless electronic device is in a lower power state. As shown in blocks 104 and 106, a determination of whether a user has pressed a button on the keypad 34 of the cordless electronic device occurs. If a button press is detected, the cordless electronic device enters a higher power state at block 110. At the initiation of the higher power state, a sleep timer 36 is started and the backlight may be illuminated. If a button press is not detected, the cordless electronic device remains in the lower power state.

After entering a higher power state, the cordless electronic device substantially maintains the higher power state until sleep timer 36 expires due to inactivity. Activity of the cordless electronic device will reset the sleep timer 36 and, likewise, extend the duration that the cordless electronic device maintains the higher power state. At blocks 112 and 114, a determination of whether the sleep timer 36 has expired occurs. The duration of the sleep timer 36 may be a predetermined or programmed period of time. If the sleep timer 36 has expired, the cordless electronic device enters the lower power state (or sleep state) at block 116. Upon initiation of the lower power state, the power supplied to power consumption circuitry is shut down or at least substantially reduced. For instance, the illumination of a backlight may be turned off. If the sleep timer 36 has not expired, processing continues at block 118.

As shown at blocks 118-134, activity of the cordless electronic device will reset the sleep timer 36. At blocks 118 and 120, a determination of whether a user has pressed a button on the keypad 34 of the cordless electronic device occurs. If a button press is detected, the sleep timer 36 is reset at block 124. If a button press is not detected, processing continues at block 126.

As shown at blocks 126-134, resetting the sleep timer 36 may require multiple conditions. At blocks 126 and 128, a determination of whether the touch sensor circuit 16 has detected that a user has touched the cordless electronic device occurs. At blocks 130 and 134, a further determination of whether the tilt sensor circuit 24 has detected movement of the cordless electronic device, such as angular movement, occurs. If both the user's touch and the movement of the cordless electronic device are detected, the sleep timer 36 is reset at block 132. If either the user's touch or the movement of the cordless electronic device are not detected, processing continues at block 112.

Figure 5:
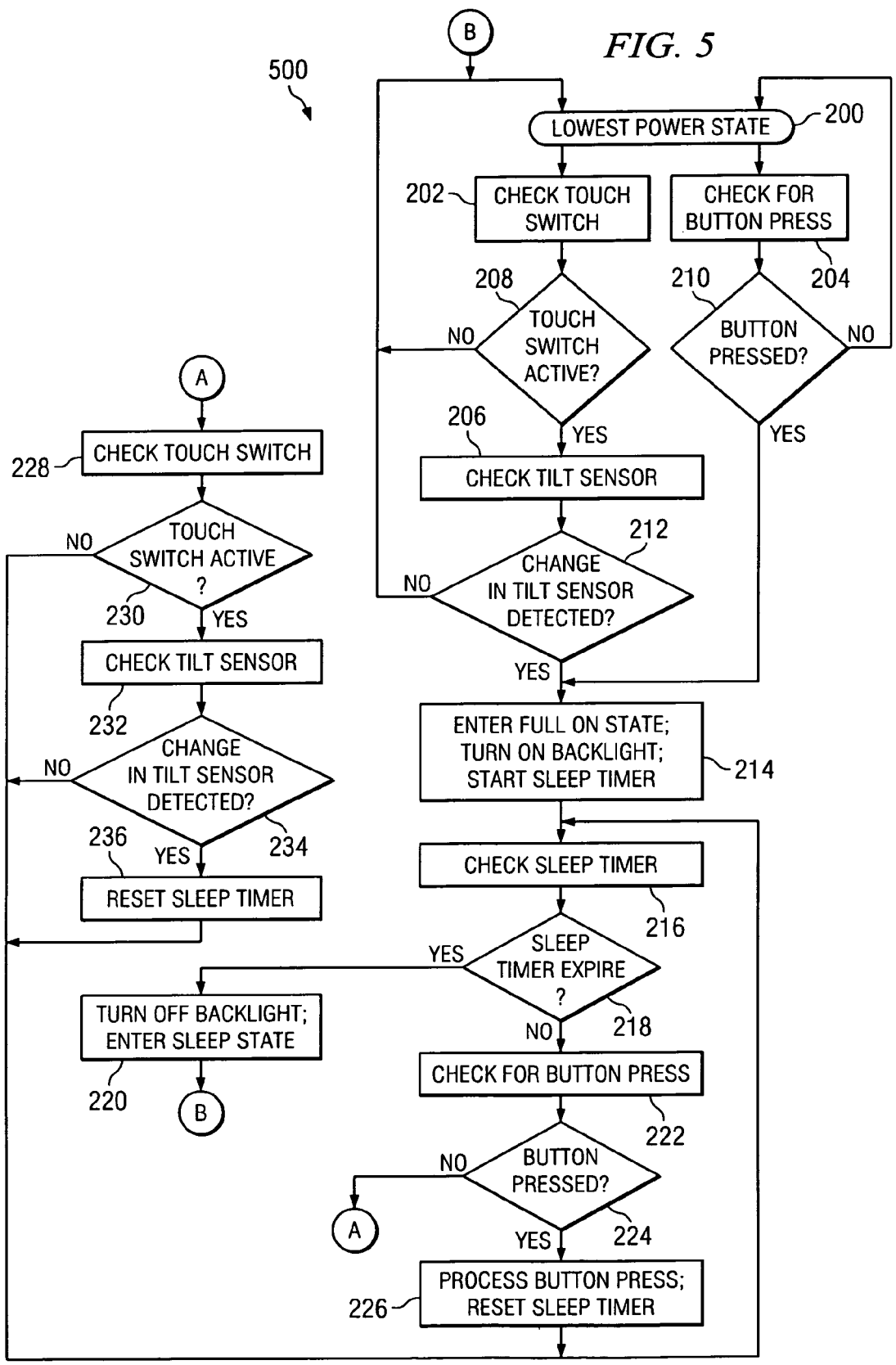

Referring to FIG. 5, a flow chart illustrating an implementation of a cordless electronic device with power management according to another possible embodiment of the present invention is shown. Similar to discussion with respect to FIG. 4 above, the cordless electronic device enters a higher power state upon detection of a button press. At block 200, the cordless electronic device is in a lower power state. As shown in blocks 204 and 210, a determination of whether a user has pressed a button on the keypad 34 of the cordless electronic device occurs. If a button press is detected, the cordless electronic device enters a higher power state at block 214. If a button press is not detected, the cordless electronic device remains in the lower power state.

As shown at blocks 202, 206-208 and 212, entering the higher power state may require multiple conditions. At blocks 202 and 208, a determination of whether the touch sensor circuit 16 has detected that a user has touched the cordless electronic device occurs. At blocks 206 and 212, a further determination of whether the tilt sensor circuit 24 has detected movement of the cordless electronic device, such as angular movement, occurs. If both the user's touch and the movement of the cordless electronic device are detected, the cordless electronic device enters a higher power state at block 214. If either the user's touch or the movement of the cordless electronic device 10 are not detected, the cordless electronic device remains in the lower power state.

Similar to the discussion with respect to FIG. 4 above, after entering a higher power state, the cordless electronic device substantially maintains the higher power state until sleep timer 36 expires due to inactivity, as shown at blocks 216-220. Activity of the cordless electronic device will reset the sleep timer 36, as shown at blocks 222-236.

Figure 6:
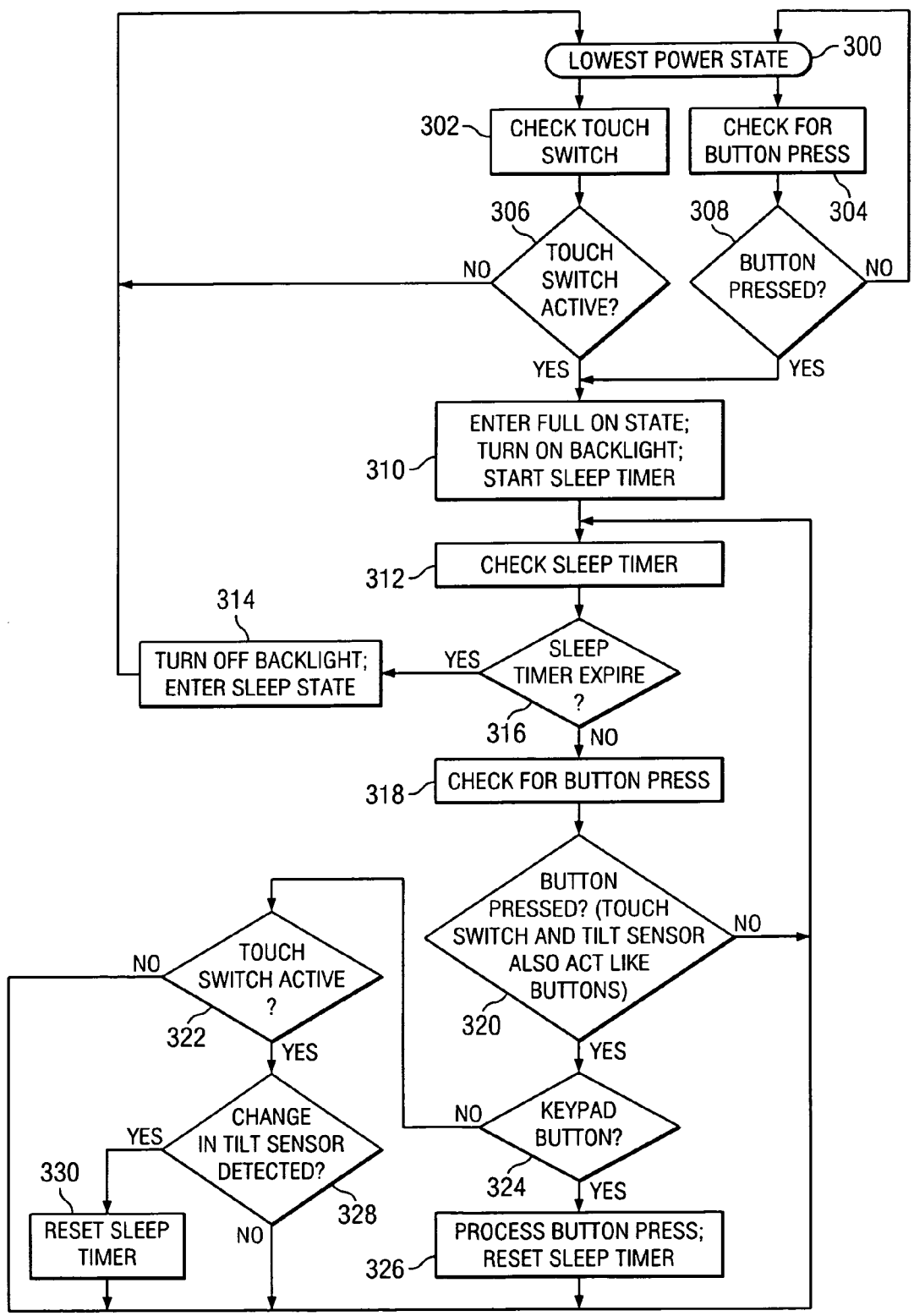

Referring to FIG. 6, a flow chart illustrating an implementation of a cordless electronic device with power management according to yet another possible embodiment of the present invention is shown. Similar to the discussion with respect to FIG. 4 above, the cordless electronic device enters a higher power state upon detection of a button press or a user's touch. At block 300, the cordless electronic device is in a lower power state. As shown in blocks 304 and 308, a determination of whether a user has pressed a button on the keypad 34 of the cordless electronic device occurs. If a button press is detected, the cordless electronic device enters a higher power state at block 310. If a button press is not detected, the cordless electronic device remains in the lower power state. At blocks 302 and 306, a determination of whether the touch sensor circuit 16 has detected that a user has touched the cordless electronic device occurs. If a user's touch is detected, the cordless electronic device enters a higher power state at block 310. If a user's touch is not detected, the cordless electronic device remains in the lower power state.

Similar to the discussion with respect to FIG. 4 above, after entering a higher power state, the cordless electronic device substantially maintains the higher power state until sleep timer 36 expires due to inactivity, as shown at blocks 312-316. Activity of the cordless electronic device will reset the sleep timer 36, as shown at blocks 318-330.

Other possible combinations are possible to enter the higher and lower power states discussed above within the scope of the present invention. As such, FIGS. 4-6 are provided as possible implementations of providing power management to the cordless electronic device and are not intended to limit the present invention in any respect. For example, upon detection that the user is no longer present, the cordless electronic device could enter a lower power state immediately without incorporating a sleep timer.

The present invention includes the capability to provide power management to a cordless electronic device, while still providing the user with the convenience of backlit keys/buttons and, in some implementations, backlit displays, such as LCD, LED type or organic LED type displays. The present invention may also include the capability to eliminate the requirement that a user has to press certain or any buttons on the cordless electronic device to turn on the backlighting or display. The present invention may include the capability to integrate multiple systems or techniques in providing power management, including, but not limited to, touch sensors, motion sensors, and timers, such as sleep timers, to deactivate or de-energize circuitry to conserve power when it is not needed, all while providing convenience and intuitive ease of operation to the user. The power savings, may be realized in reducing the time that the backlighting or lighting is used by the cordless electronic device. The present invention may include the capability to save power by minimizing the accidental activation of backlighting, such as when a cordless electronic device button is unintentionally pressed and activated. The present invention may further include the capability to save power by minimizing the activation of backlighting when the user is holding the cordless electronic device, but is not currently using the cordless electronic device. Since users may hold on to a cordless electronic device while watching or listening to an audio/visual appliance, the backlighting is not constantly consumed during such extended periods, but may be easily turned on by a quick tilt of the cordless electronic device.

Thus, it is apparent that there has been provided, in accordance with the present invention, a cordless electronic device with power management that satisfies one or more of the advantages set forth above. Although the preferred embodiment has been described in detail, it should be understood that various changes, substitutions, and alterations can be made herein without departing from the scope of the present invention, even if all of the advantages and benefits identified above are not present. For example, the various embodiments and examples shown in the drawings and descriptions provided herein illustrate that the present invention may be implemented and embodied in numerous different ways that still fall within the scope of the present invention, whether expressly shown herein or not. For example, the various elements or components may be combined or integrated in another system or certain features may not be implemented. Also, the techniques, systems, sub systems, and methods described and illustrated in the preferred embodiment as discrete or separate may be combined or integrated with other systems, designs, techniques, or methods without departing from the scope of the present invention. For example, various different sensors may be integrated into a single device or circuitry and can be placed in a variety of locations, including locations not specifically discussed herein. Other examples of changes, substitutions, and alterations are readily ascertainable by one skilled in the art and could be made without departing from the spirit and scope of the present invention. It is therefore to be understood that within the scope of the disclosed concept, the invention may be practiced otherwise then as specifically described.

The invention claimed is:

1. A cordless electronic device with power management, comprising:
   an outer surface;
   a power consumption circuit operable to consume power and for use in the cordless electronic device;
   a power supply circuit operable to regulate the power from a power source used to power the power consumption circuit;
   a power control circuit operable to receive an input signal and to place the power consumption circuit in a lower or higher power state upon receipt of the input signal;
   a presence sensor operable to detect the presence of a user and to provide a presence sensor input signal to the power control circuit to place the power consumption circuit in the higher power state upon detection of the presence of the user; and
   a motion sensor operable to detect motion of the cordless electronic device, and to provide a motion sensor input signal to the power control circuit to place the power consumption circuit in the higher power state upon the motion detection, wherein the motion sensor is configured to provide the motion sensor input signal to the power control circuit only if the presence sensor detects the user touching the outer surface.

2. The cordless electronic device of claim 1, wherein the presence sensor is a touch sensor operable to detect the user touching at least a portion of the outer surface.

3. The cordless electronic device of claim 1, wherein the presence sensor is a proximity sensor operable to detect the user in a close proximity to the cordless electronic device.

4. The cordless electronic device of claim 1, further comprising:
   a transmitter or transceiver operable to generate and transmit an electromagnetic signal; and
   a keypad with a plurality of buttons positioned adjacent the outer surface and operable to be selected by the user, wherein the transmitter generates a specified electromagnetic signal upon selection of one or more of the plurality of buttons.

5. The cordless electronic device of claim 4, wherein the cordless electronic device comprises a remote control device.

6. The cordless electronic device of claim 4, wherein the keypad is operable to provide a keypad input signal to the power control circuit to place the power consumption circuit in the higher power state upon selection of one or more of the plurality of buttons by the user.

7. The cordless electronic device of claim 4, wherein the keypad is operable to provide a keypad input signal to the power control circuit to place the power consumption circuit in the lower power state if one of the plurality of buttons is continuously selected for a specified period.

8. The cordless electronic device of claim 4, wherein the keypad is operable to provide a keypad input signal to the power control circuit to place the power consumption circuit in the lower power state if two or more of the plurality of buttons are selected substantially simultaneously.

9. The cordless electronic device of claim 1, further comprising a sleep timer operable to be activated for an elapsed period, and to provide a sleep timer input signal to the power control circuit to place the power consumption circuit in the lower power state after the sleep timer has been activated for the elapsed period.

10. The cordless electronic device of claim 4, further comprising a sleep timer operable to be activated for an elapsed period, and to provide a sleep timer input signal to the power control circuit to place the power consumption circuit in the lower power state after the sleep timer has been activated for the elapsed period.

11. The cordless electronic device of claim 9, wherein the elapsed period is reset upon receipt of at least one of the presence sensor input signal and the motion sensor input signal.

12. The cordless electronic device of claim 10, wherein the elapsed period is reset upon receipt of the keypad input signal.

13. The cordless electronic device of claim 9, wherein the elapsed period is reset upon the substantially simultaneous receipt of the presence sensor input signal and the motion sensor input signal.

14. The cordless electronic device of claim 10, wherein the elapsed period is reset upon the substantially simultaneous receipt of the presence sensor input signal and the keypad input signal.

15. The cordless electronic device of claim 4, wherein the keypad is configured to provide the keypad input signal to the power control circuit only if the presence sensor detects the user touching the outer surface.

16. The cordless electronic device of claim 4, wherein the power control circuit is configured to ignore the keypad input signal unless the power control circuit receives the presence sensor input signal within a predetermined interval.

17. The cordless electronic device of claim 4, wherein the electromagnetic signal is an infrared signal.

18. The cordless electronic device of claim 4, wherein the electromagnetic signal is a radio-frequency signal.

19. The cordless electronic device of claim 4, wherein the power consumption circuit is a light operable to illuminate one or more of the buttons of the keypad.

20. The cordless electronic device of claim 1, wherein the power consumption circuit is a microprocessor.

21. The cordless electronic device of claim 1, wherein the power consumption circuit is an electronic display operable to display at least one of text and graphics.

22. The cordless electronic device of claim 21, wherein the electronic display is a liquid crystal type display.

23. The cordless electronic device of claim 21, wherein the electronic display is an organic LED type display.

24. The cordless electronic device of claim 1, wherein the power supply circuit includes DC to DC converters.

25. The cordless electronic device of claim 1, wherein the presence sensor includes a conductive piece, and wherein the presence sensor detects the presence of the user when the user touches the conductive piece.

26. The cordless electronic device of claim 25, wherein the conductive piece comprises a side railing.

27. The cordless electronic device of claim 25, wherein the conductive piece comprises two side railings.

28. The cordless electronic device of claim 27, wherein the presence sensor detects the presence of the user when both of the side railings are touched by the user.

29. The cordless electronic device of claim 27, wherein the presence sensor detects the presence of the user when one of the two side railings is touched by the user.

30. The cordless electronic device of claim 25, wherein the presence sensor detects the presence of the user upon detection of a changed resistance resulting from the user touching the conductive piece.

31. The cordless electronic device of claim 25, wherein the presence sensor detects the presence of the user upon detection of a changed capacitance resulting from the user touching the conductive piece.

32. The cordless electronic device of claim 4, wherein the power consumption circuit is a backlight operable to illuminate one or more of the buttons of the keypad.

33. The cordless electronic device of claim 25, wherein the presence sensor detects the presence of the user upon detection of a AC power carrier frequency in the user resulting from the user touching the conductive piece.

34. The cordless electronic device of claim 33, wherein the AC power carrier frequency is 60 Hz.

35. The cordless electronic device of claim 1, wherein the motion sensor is an accelerometer.

36. The cordless electronic device of claim 1, wherein the motion sensor is a tilt sensor.

37. The cordless electronic device of claim 36, wherein the motion sensor detects motion upon detection of an orientation angle of at least 20 degrees from horizontal of the cordless electronic device.

38. The cordless electronic device of claim 1, wherein the motion sensor is a ball bearing switch.

39. The cordless electronic device of claim 1, wherein the motion sensor is an optical/mechanical sensor.

40. The cordless electronic device of claim 9, wherein the sleep timer is implemented using a microprocessor.

41. The cordless electronic device of claim 4, wherein the power consumption circuit is an electroluminescent light operable to illuminate one or more of the buttons of the keypad.

42. The cordless electronic device of claim 1, wherein the presence sensor is further operable to provide a presence sensor input signal to the power control circuit to place the power consumption circuit in the lower power state if the presence of a user is not detected.

43. The cordless electronic device of claim 1, wherein the motion sensor is further operable to detect a horizontal orientation of the cordless electronic device and to provide a motion sensor input signal to the power control circuit to place the power consumption circuit in the lower power state upon detection of the horizontal orientation.

44. The cordless electronic device of claim 1, wherein the power control circuit is further operable to place the power consumption circuit in a plurality of lower or higher power states upon receipt of the input signal.

45. A method of managing power for a power consumption circuit operable to consume power of a cordless electronic device, the method comprising:
    providing a power supply circuit operable to regulate the power from a power source used to power the power consumption circuit;

providing a power control circuit operable to receive an input signal and to place the power consumption circuit in a lower or higher power state upon receipt of the input signal;

providing a presence sensor operable to detect the presence of a user;

detecting the presence of the user;

sending a presence sensor input signal to the power control circuit upon the user detection;

placing the power consumption circuit in the higher power state upon receipt of the presence sensor input signal;

providing a motion sensor operable to detect motion of the cordless electronic device;

detecting the motion of the cordless electronic device;

sending a motion sensor input signal to the power control circuit upon the motion detection, wherein the motion sensor is configured to provide the motion sensor input signal to the power control circuit only if the presence sensor detects the user touching an outer surface of the cordless electronic device; and placing the power consumption circuit in the higher power state upon receipt of the motion sensor input signal.

46. The method of claim 45, wherein the cordless electronic device further includes a keypad with a plurality of buttons operable to be selected by the user, the method further comprising:

detecting the selection of one or more of the plurality of buttons;

sending a keypad input signal to the power control circuit upon the selection detection; and placing the power consumption circuit in the higher power state upon receipt of the keypad input signal.

47. The method of claim 45, wherein the cordless electronic device further includes a keypad with a plurality of buttons operable to be selected by the user, the method further comprising:

detecting the continuous selection of one or more of the plurality of buttons for a specified period by a user;

sending a keypad input signal to the power control circuit upon the selection detection; and placing the power consumption circuit in the lower power state upon receipt of the keypad input signal.

48. The method of claim 45, further comprising:

providing a sleep timer operable to be activated for an elapsed period;

detecting the transmission of input signals to the power control circuit;

activating the sleep timer when an input signal transmission is not detected;

resetting the elapsed period of the sleep timer upon detection of an input signal transmission; and placing the power consumption circuit in the lower power state after the sleep timer has been activated for the elapsed period.

49. The method of claim 46, further comprising:

providing a sleep timer operable to be activated for an elapsed period;

detecting the transmission of input signals to the power control circuit;

activating the sleep timer when an input signal transmission is not detected;

resetting the elapsed period of the sleep timer upon detection of an input signal transmission; and placing the power consumption circuit in the lower power state after the sleep timer has been activated for the elapsed period.

50. The method of claim 45, wherein the elapsed period is reset upon receipt of at least one of the presence sensor input signal and the motion sensor input signal.

51. The method of claim 49, wherein the elapsed period is reset upon receipt of the keypad input signal.

52. The method of claim 45, wherein the elapsed period is reset upon the substantially simultaneous receipt of the presence sensor input signal and the motion sensor input signal.

53. The method of claim 49, wherein the elapsed period is reset upon the substantially simultaneous receipt of the presence sensor input signal and the keypad input signal.

54. A cordless electronic device with power management, comprising:

an outer surface;

a power consumption circuit operable to consume power and for use in the cordless electronic device;

a power supply circuit operable to regulate the power from a power source used to power the power consumption circuit;

a power control circuit operable to receive an input signal and to place the power consumption circuit in a lower or higher power state upon receipt of the input signal;

a presence sensor operable to detect the presence of a user and to provide a presence sensor input signal to the power control circuit to place the power consumption circuit in the higher power state upon detection of the presence of the user; and a motion sensor operable to detect motion of the cordless electronic device, and to provide a motion sensor input signal to the power control circuit to place the power consumption circuit in the higher power state upon the motion detection, wherein the power control circuit is configured to ignore the motion sensor input signal unless the power control circuit receives the presence sensor input signal within a predetermined interval.

55. A method of managing power for a power consumption circuit operable to consume power of a cordless electronic device, the method comprising:

providing a power supply circuit operable to regulate the power from a power source used to power the power consumption circuit;

providing a power control circuit operable to receive an input signal and to place the power consumption circuit in a lower or higher power state upon receipt of the input signal;

providing a presence sensor operable to detect the presence of a user;

detecting the presence of the user;

sending a presence sensor input signal to the power control circuit upon the user detection;

placing the power consumption circuit in the higher power state upon receipt of the presence sensor input signal;

providing a motion sensor operable to detect motion of the cordless electronic device;

detecting the motion of the cordless electronic device;

sending a motion sensor input signal to the power control circuit upon the motion detection, wherein the power control circuit is configured to ignore the motion sensor input signal unless the power control circuit receives the presence sensor input signal within a predetermined interval; and placing the power consumption circuit in the higher power state upon receipt of the motion sensor input signal.

* * * * *